Patented Oct. 10, 1933

1,929,528

UNITED STATES PATENT OFFICE 1,929,528

HYDROGENATION OF CARBONACEOUS MATERIAL

Hein Israel Waterman, Delft, Netherlands, assignor to Naamlooze Vennootschap De Bataafsche Petroleum Maatschappij, The Hague, Netherlands No Drawing. Application October 17, 1929, Serial No. 400,459, and in the Netherlands November 7, 1928

4 Claims. (Cl. 196—53)

The invention relates to the hydrogenation of carbonaceous materials and more particularly to a process for the manufacture of liquid products from coal or material containing coal and for the liquefaction of these raw materials.

The object of my invention is to obtain or render possible a maximum conversion of the said materials into liquid products in the known method according to which the primary substances are exposed to the action of hydrogen or gases or vapours containing hydrogen under a high pressure and temperature and in the presence of a contact mass or catalyst.

In particular my invention concerns a catalyst eminently suitable for the above process.

In French Patent Specification No. 618,490 attention is drawn to the favourable catalytic effect exercised upon the hydrogenation process by an alkaline ironoxide-containing material called "Luxmass."

The so-called Luxmass is obtained as a by-product from the wet-treatment of bauxite to form aluminium oxide, by treating bauxite with alkaline lye, whereby the aluminium compounds are dissolved as aluminates and a residue is obtained, which is for the greater part composed of iron oxide and which is separated from the liquid.

From British Patent Specification No. 247,583 it is known how to use molybdenum compounds for the same purpose. Further the use of molybdenums or its compounds, mixed with other catalysts, such as iron, cobalt, $Al(OH)_3$, $CaCO_3$, clay or the like inert materials, is mentioned in the said specification.

In my copending application Serial No. 369,004 a process is described for the liquefaction of coal or material containing coal, whereby there is used as a catalyst "Luxmass", which has undergone a certain pre-treatment for increasing the catalytic action.

Said pre-treatment consists in subjecting the Luxmass to a mechanical, physical or chemical treatment or to a combination of said treatments, in order to bring it into a state in which it has a greater catalytic effect than the original mass. Such an increased catalytic action may for instance be obtained by treating the Luxmass with water or by dissolving same in nitric acid and thereafter precipitating with ammonia.

I have now found that mixtures of the Luxmass pretreated in the manner described in the copending application with molybdenum or molybdenum compounds can be successfully used instead of equal quantities of each of the components of the mixture, and consequently the process according to my invention consists in the said reaction being carried out in the presence of Luxmass pretreated in the manner described in my copending application, together with molybdenum or one or more molybdenum compounds or with materials containing molybdenum or molybdenum compounds.

I have found that such a mixture gives just as good results as the respective molybdenum compound alone, and generally better results than are obtained with the same quantity of pretreated Luxmass.

Economically the process according to my invention certainly constitutes an improvement, seeing that the expensive molybdenum compounds can, as a rule, be replaced in part by a cheaper catalyst.

The Luxmass may be pretreated in any of the following manners to activate the same, as described in my co-pending application No. 369,004;

I. 40 grams of the Luxmass containing 36.6 grams dry substance is treated and retreated on a steam-bath with about 0.5 litre of water at a time; after settling the liquid is poured off. The mass is then filtered and dried at about 120° C. By this treatment about 13.4% of the original dry substance is removed.

II. Luxmass is dissolved as much as possible in nitric acid and thereafter precipitated with ammonia. The precipitated mass is washed and dried.

III. Luxmass is washed with water several times and thereafter the finer-grained particles are separated from the coarser-grained ones. The finer-grained part appeared to have a more favorable influence on the hydrogenation process than the original Luxmass.

The catalyst according to the invention is made by merely mixing the Luxmass pretreated as described above with the molybdenum catalyst. The latter may consist of molybdenum and/or molybdenum compounds or of material containing molybdenum and/or molybdenum compounds.

The following examples are quoted to illustrate the execution of the improved process according to this invention. Three hydrogenations were carried out on similar kinds and quantities of brown coal, namely, 206 grammes of brown coal with 3% moisture and 9.3% ash content; these hydrogenations being effected, respectively, with 23 grams Luxmass treated with water; with 7.7 grams Luxmass treated with water, mixed with 15.2 grams iron molybdate; and with 23 grams iron molybdate.

These experiments were as far as possible all carried out under the same reaction circumstances. Within 50 minutes the mass was heated with hydrogen from room temperature to 460° C. with an initial pressure of 100 kg. per square centimetre, increasing in about 30 minutes to a maximum of about 250 to 260 kg. per square centimetre. Immediately after the highest temperature is reached the material is allowed to cool down for about 15 minutes. The pressure was then about 170 kg. per square centimetre, whilst the temperature ranged between 300° and 340° C. The material was then run off.

The results are laid down in the subjoined statement showing the percentages of the water-free and ash-free browncoal.

| Catalyst | Total quantity of oil | Coal residue |
|---|---|---|
| 23 gr. pretreated Luxmass | 59.1 | 3.6 |
|  | 57.2 | 3.9 |
| 7.7 gr. pretreated Luxmass + | 64.5 | 1.7 |
| 15.2 gr. iron molybdate | 64.0 | 1.5 |
| 23.0 gr. iron molybdate | 62.9 | 3.9 |
|  | 63.2 | 2.5 |

The percentages of water and gases produced in this process have been omitted for sake of simplicity.

It will be observed that the yield of oil obtained using the mixture of Luxmass and iron molybdate is higher than the yield obtained using either constituent separately.

In the following claims, by the term "Luxmass" is to be understood the by-product of bauxite defined in the specification, and by the term "activation" is to be understood any of the pre-treatments of this Luxmass herein described.

What I claim is:

1. A process for the hydrogenation of carbonaceous materials, including the step of subjecting said materials to destructive hydrogenation in the presence of a catalyst comprising a mixture containing molybdenum and an activated mass derived from an alkaline iron oxide-containing mass obtained from the conversion of bauxite to aluminum oxide by the wet treatment.

2. A process for the hydrogenation of carbonaceous materials, including the step of treating said materials with hydrogen at a maximum pressure of about 250 kg. per square centimetre and a maximum temperature of about 460° C. in the presence of a catalyst consisting of a mixture containing molybdenum and an activated mass derived from an alkaline iron oxide-containing mass obtained from the conversion of bauxite to aluminum oxide by the wet treatment.

3. A process for the hydrogenation of coal, including the step of treating said material with hydrogen at a maximum pressure of about 250 kg. per square centimetre and to a maximum temperature of about 460° C. in the presence of a catalyst consisting of a mixture containing iron molybdate and an activated mass derived from an alkaline iron oxide-containing mass obtained from the conversion of bauxite to aluminum oxide by the wet treatment in the proportions of 15.2 grammes of iron molybdate and 7.7 grammes of said activated mass.

4. A process for the hydrogenation of organic carbonaceous materials, characterized by treating said materials, in the presence of a catalyst containing molybdenum and an activated mass derived from an alkaline iron oxide-containing mass obtained from the conversion of bauxite to aluminum oxide by the wet treatment with hydrogen under heat rising from room temperature to about 460° C. within about fifty minutes, the pressure increasing from about 100 to 250 kg. per square centimetre, stopping the heating and allowing the reaction material to cool for about 15 minutes to a temperature of 300°–340° C. with consequent pressure reduction to about 170 kg. per square centimetre, and running off the product.

HEIN ISRAEL WATERMAN.